United States Patent [19]

Cioca

[11] 4,363,760

[45] Dec. 14, 1982

[54] PARTIALLY HYDROLYZED ELASTIN FROM LIMED HIDE TRIMMINGS

[75] Inventor: Gheorghe Cioca, Coatesville, Pa.

[73] Assignee: Seton Company, Newark, N.J.

[21] Appl. No.: 296,985

[22] Filed: Aug. 27, 1981

[51] Int. Cl.³ .......................... A23J 1/10; C07G 7/06; C08L 89/06; C08L 89/04

[52] U.S. Cl. .................................. 260/123.7; 424/177

[58] Field of Search ...................................... 260/123.7

[56] References Cited

U.S. PATENT DOCUMENTS

| | | | |
|---|---|---|---|
| 2,622,036 | 12/1952 | Alexander et al. | 260/123.7 X |
| 2,728,759 | 12/1955 | Keil | 260/123.7 X |
| 2,928,822 | 3/1960 | Johnsen et al. | 260/123.7 X |
| 3,427,301 | 2/1969 | Needles et al. | 260/123.7 X |
| 4,285,986 | 8/1981 | Cioca et al. | 260/123.7 X |
| 4,295,894 | 10/1981 | Cioca et al. | 260/123.7 X |

OTHER PUBLICATIONS

Nature, vol. 200, 1963, pp. 651-652 (Thomas et al.).
Biochem J. (1964), pp. 30C-33C, Partridge et al.
Canadian Journal of Biochemistry, vol. 44 (1966), ANWAR pp. 725-734.
J. of Chromatography, vol. 31 (1967), LeDvina et al., pp. 56-61, Analytical Biochemistry 32, 118-121 (1969), Corbin.
American Leather Chemists Association Journal, 67, pp. 545-564 (1971), Deasy et al.
Biochemical & Biophysical Research Communications, vol. 17, (1964), pp. 248-253, Miller et al.
A. Berg, Z. Eckmayer, S. Smith "Elastin", *Cosmetics & Toiletries*, vol. 94, Oct. 1979, pp. 23-38.

*Primary Examiner*—Howard E. Schain
*Attorney, Agent, or Firm*—Webb, Burden, Robinson & Webb

[57] ABSTRACT

A method of preparing soluble partially hydrolyzed elastin is disclosed. The method involves treating insoluble elastin with a peroxide and subsequently partially hydrolyzing the treated elastin and recovering substantially pure soluble partially hydrolyzed elastin.

12 Claims, No Drawings

PARTIALLY HYDROLYZED ELASTIN FROM LIMED HIDE TRIMMINGS

BACKGROUND OF THE INVENTION

This invention relates to the preparation of partially hydrolyzed elastin. Elastin is the major component of elastic fibers found primarily in connective tissue in conjunction with collagen and polysaccharides. Major concentrations of elastin are found in blood vessels. Another source of elastin is in the ligaments and more particularly the ligamentum nuchae prominent in the necks of grazing animals and in their hides.

Elastin is known to have a highly distinctive amino acid composition. Although similar to collagen in that one-third of the amino acids residues are glycine, elastin is rich in proline and in contrast to collagen, elastin contains very little hydroxyproline, no hydroxylysine and is very low in polar amino acids. Elastin is very rich in nonpolar aliphatic residues such as isoleucine, leucine, valine and alanine. Elastin, as present in mature animals, is highly cross-linked, therefore, making it very difficult to solubilize. This dense cross-linking is attributable to the desmosine and isodesmosine residues which are highly functional and cross-link both intra- and interfibularly. It is believed that the desmosine and isodesmosine cross-linking gives the elastin fibers their elasticity. The desmosine residue can be represented by the structural formula:

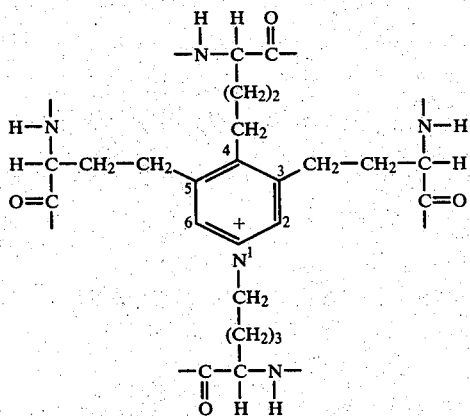

And the isodesmosine residue represented by the structural formula:

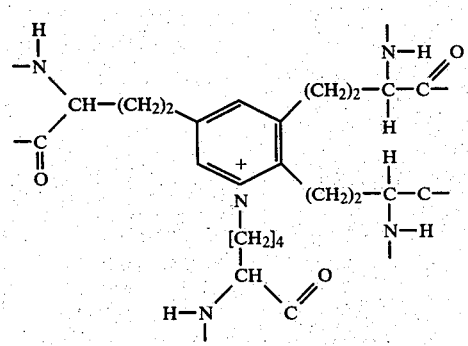

This highly cross-linked structure is extremely difficult to solubilize and purify, especially in the case of mature animals such as horses, cows, and the like, which are aged and thus contain elastin which has an extremely high cross-link density.

Prior art methods of solubilizing elastin primarily include the use of elastases to hydrolyze the peptide linkages to provide an acceptable product.

Solubilized elastin has found utility in the cosmetic and pharmaceutical fields. However, its manufacture has been limited to small quantities and it is not necessarily of acceptable purities because of the enzymatic residue required for the hydrolysis.

One particular method of producing elastin by nonenzymatic means is disclosed in "ELASTIN" by Berg et al., *Cosmetics & Toiletries*, Vol. 94, October, 1979.

In accordance with the present invention, a method of producing partially hydrolyzed elastin in pure form is provided without the need for enzymatic digestion and the removal of attendant residual enzymes in the predigest.

BRIEF DESCRIPTION OF THE INVENTION

A method of preparing soluble partially hydrolyzed elastin is provided. The method involves treating insoluble elastin with a peroxide and subsequently partially hydrolyzing the treated elastin and recovering substantially pure soluble partially hydrolyzed elastin.

DETAILED DESCRIPTION OF THE INVENTION

The elastin containing material may be obtained from a variety of sources well-known to those skilled in the art. Preferably, the source of elastin is natural insoluble elastin from a bovine hide which also contains a substantial amount of natural and insoluble collagen. One preferred source of elastin which is derived from bovine hides is limed hide trimmings, untanned tannery wastes, limed splits and raw hides. Primarily, this source of elastin is unprocessed bovine animal covering. Another source of elastin which is preferred is the bovine ligamentum nuchae which has about 80 percent by weight elastin therein.

In preparing elastin from the non-putrefied and non-tanned animal covering, the collagen must be separated from the elastin in order to obtain a pure material. This raises some difficulty since collagen is insoluble and is cross-linked but not to the extent of elastin. In U.S. patent application Ser. No. 113,694, now U.S. Pat. No. 4,285,986 entitled "Oligopeptides Derived From Collagen" of Gheorghe Cicoa and Marcel Siegler filed Jan. 21, 1980, a method of preparing oligopeptides derived from collagen is disclosed. In accordance with that patent application, the non-putrefied animal covering is treated to recover oligopeptides. A byproduct of this process is a cross-linked elastin residue.

In order to remove the collagen from the starting material, the starting material is treated with an aqueous solution of a member selected from the group consisting of an alkali earth metal hydroxide, an alkali metal hydroxide and mixtures thereof in the presence of an agent which prevents overswelling of the collagen. The treatment removes substantially all of the hair and fat from the starting material. The remaining soluble residues, such as fats, soluble proteins and the like, are removed by treating the dehaired and defatted collagen with an aqueous solution which acts as a solvent for such impurities. The collagen recovered by the process is neutralized and residual salts are removed therefrom. More particularly, the solid oligopeptides derived from the collagen are solubilized in an admixture of cross-linked elastin in the polypeptide solution. The solution is filtered and the filtrate contains the solid cross-linked elastin in a relatively high concentration. The filtrate is autoclaved and treated with a peroxide which is believed to destabilize the desmosine and isodesmosine cross-linkages. The treated elastin is then partially hydrolyzed to form a solubilized elastin and the solubilized elastin is recovered. It must be recognized, however, that this is only one method of obtaining and purifying and solubilizing or partially hydrolyzing the elastin within the scope of the invention.

When the starting material for the preparation of the partially hydrolyzed soluble elastin is from the animal coverings as previously described, the agent which prevents the overswelling of the collagen is preferably a salt, such as sodium chloride or potassium chloride or an alkali sulfate such as sodium sulfate or an alkali metal sulfate, preferably sodium chloride or potassium chloride is used. Further, lower alcohols having 1 to 4 carbon atoms may also be used as an agent to prevent overswelling of the collagen. The aqueous solution of the alkali hydroxide, alkali earth metal hydroxide, and an agent which prevents overswelling of the collagen, is composed of 1 molar to 2.5 molar of the combined alkali earth metal hydroxide and alkali metal hydroxide, 0.5 molar to 1 molar of the agent which prevents overswelling of the collagen, and more preferably, 2.0 molar to 2.5 molar of the combined alkali metal hydroxide and alkali earth metal hydroxide and 0.9 molar to 1.0 molar of the agent to prevent the overswelling of the collagen. Other salt constituents may be added at a level of about 0.1 molar to 0.2 molar. The resultant aqueous solution should be at an initial pH of about 12 to 13.

Care should be taken to properly proportion the alkali earth metal hydroxide, the alkali metal hydroxide and the agent to prevent overswelling of the collagen (if it is to be recovered) and elastin in order to provide for complete saponification of fats suspended within the natural fibrous proteins. If too much sodium hydroxide is used, the collagen and elastin will be denatured and intermolecular bonds will be severed solubilizing some of the elastin polypeptide chains thereby lowering the yield of the final elastin product. If insufficient sodium hydroxide is used, the collagen product will have retained impurities and the elastin product will have retained collagen polypeptides along with fats and other hydrolyzable materials which are undesirable.

In treating the fibrous proteins, both collagen and elastin containing material with the aqueous solution previously described, the fibrous protein containing material should be cut into pieces which are sufficiently small so that aqueous solution may penetrate and react therein. The natural insoluble fibrous protein containing pieces should be about 10 cubic centimeters and more preferably 5 cubic centimeters or less. Treatment in the aqueous solution should be for about 1 to 7 days to dehair and defat the fibrous protein containing material. The fibrous protein containing material substantially free of hair and fat is delimed and neutralized to a pH of about 7 by treating with an acidic buffer solution having a pH of 2 to 3.5. For example, the combination of ammonium chloride and hydrochloric acid may be used for the deliming and acidification. The pH of the cross section of the fibrous protein containing material after extraction should be about 7. The neutralized fibrous protein containing material is preferably washed with running water and deposited in distilled water overnight, i.e., from about 8 to 12 hours, to extract any residual salts or soluble impurities retained in the material.

The water is removed and the fibrous protein containing material is treated under heat and pressure for 6 to 15 hours at a pressure of 1 to 2.5 atmospheres at a temperature of 120° C. to 150° C. Sufficient water is retained within the fibrous protein containing material to hydrolyze the collagen under these conditions leaving the elastin in the cross-linked state. This hydrolysis treatment hydrolyzes various polypeptide bonds within the collagen to produce the oligopeptides which are subsequently to be recovered.

After hydrolysis of the collagen under heat and pressure, the oligopeptides, in aqueous media, are cooled to about preferably 4° C. The fats solidify and float to the top and the cross-linked elastin, along with other solid materials, sediment to the bottom. The oligopeptides are soluble in the aqueous phase of the media. The sediment which contains cross-linked elastin is removed and fat is skimmed from the surface thereof and the remaining solution contains substantially pure collagen oligopeptides.

The sediment is autoclaved at 2.2 to 3.0 atmospheres pressure and preferably 2.2 to 2.5 atmospheres for 2 to 6 hours and preferably about 4 hours. Subsequent to autoclavation a solid insoluble material having absorbed water therein and containing about 25 to 75 percent cross-linked elastin based on the weight of the dry material is recovered.

After autoclavation the raw elastin containing material is washed to remove any residual salts and soluble materials. The cross-linked elastin is separated from the wash water by filtration or the like.

After washing, the raw insoluble cross-linked elastin is treated with peroxide. The peroxides useful in the practice of the invention are both inorganic and organic peroxides while the inorganic peroxides are preferred. Exemplary inorganic peroxides are hydrogen peroxide and ammonium persulfate. Ammonium persulfate is represented by the structural formula:

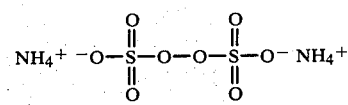

Organic peroxides may be used and are selected on the basis of decomposition half-life in the presence or absence of a suitable accelerator. Typical organic peroxides are tertiary-butyl hydroperoxide, benzol peroxide, lauryl peroxide, dicumene hydroperoxide and the like. Combinations of various peroxides may be used in treating the insoluble elastin. Preferably, the peroxide is present at a level of about 0.025 to 0.5 percent by weight based on the weight of the insoluble elastin, and more preferably, about 0.1 to 0.25 percent by weight based on the weight of the insoluble elastin. It has been found that hydrogen peroxide and ammonium persulfate mixed together in approximately equal quantities are useful in treating the insoluble elastin. It is believed that the peroxide destabilizes the desmosine and isodesmosine cross-linkages which is required to partially hydrolyze and solubilize the elastin. Preferably, the insoluble elastin is treated with the peroxide in the presence of water under refluxing conditions. When ammonium persulfate and hydrogen peroxide are used in equal quantities as the peroxide constituents, the elastin is treated in the presence thereof at about 3 to 5 hours and more preferably 3 to 4 hours under reflux.

After treatment with the peroxide, the peroxide treated elastin is partially hydrolyzed, preferably in an acidic solution. Most preferably the acidic solution is composed of water and a mineral acid such as hydrochloric acid, sulfuric acid or the like. However, weaker acids such as acetic acid may also be used but are not preferred. In order to hydrolyze the elastin it is necessary to heat the elastin in the presence of the acid, preferably at reflux and at atmospheric pressure. In the case of a solution of 3 to 10 percent of hydrochloric acid and preferably 5 to 7 percent hydrochloric acid, refluxing treatment is between about 4 to 8 hours and preferably 4 to 7 hours.

After acid hydrolysis the hydrolyzed elastin solution is filtered. The filtrate is dried and the dried material is redissolved in water. The solution of partially hydrolyzed soluble elastin is adjusted to a pH of 6 to 7 using an appropriate base such as sodium hydroxide, potassium hydroxide or the like. The pH adjustment is made with a weak solution of such base, having a concentration of up to 3 percent of the base, but preferably less than 1 percent of the base. The substantially pure partially hydrolyzed soluble elastin has a molecular weight between 500 and 1000 and has been found to contain desmosine and isodesmosine residues. After redissolving the partially hydrolyzed elastin it may be further purified by treatment with activated carbon or the like. Further, if the solution is hazy it may further be treated with hydrogen peroxide or a similar peroxide to make the solution transparent.

When animal parts having high concentrations of elastin are processed in accordance with the invention such as bovine ligamentum nuchae, the elastin containing material is washed and then heated with peroxide in accordance with the procedure previously described. The procedure for producing the soluble partially hydrolyzed elastin from high elastin animal parts deviates from the procedure for producing the partially hydrolyzed elastin from hides and the like in that the steps for removing the collagen are eliminated.

Antioxidants may be added to impart prolonged shelf life to the elastin solution. Typical stabilizers are para B, phenip, sorbic acid or other stabilizers known to those skilled in the art.

If a nonaqueous solution of the partially hydrolyzed elastin is desired, the dried material may be dissolved in propylene glycol, dipropylene glycol or the like.

The invention is further illustrated by reference to the following examples.

EXAMPLE I

One hundred kilograms of collagen containing material, including raw hide, untanned tannery wastes, limed splits and trimming scraps were charged to a suitable vessel containing 300 liters of water having therein 10 kilograms of calcium hydroxide, 5 kilograms of sodium hydroxide and 5 kilograms of sodium chloride. The fibrous protein containing material was allowed to stand in the aqueous solution at ambient temperature for 5 days. After 5 days, the vessel was drained and the fibrous protein containing material free of hair and fats was neutralized to a pH of 7 by treating with an aqueous solution of 30 liters of water which contained 1.5 kilograms of ammonium chloride and 1.5 kilograms of hydrochloric acid. The pH of the cross section of fibrous protein containing material was about 7. The neutralized fibrous protein containing material was washed with 300 liters of running water and deposited in 600 liters of distilled water for 12 hours. The distilled water extracted residual salts from the fibrous protein containing material. The distilled water was drained and the fibrous protein containing material was charged to an autoclave for 8 hours at a pressure of 2 kilograms/cm$^2$. The treatment under heat and pressure hydrolyzed the polypeptide bonds within the collagen while leaving the elastin in a cross-linked condition. The oligopeptides formed of the hydrolyzed collagen were water soluble and had a molecular weight between 5,000 and 20,000.

After treatment under heat and pressure, the oligopeptide solution was cooled to about 4° C. Upon cooling a small amount of fat rose to the surface of the solution and cross-linked elastin along with other minor impurities precipitated. The collagen oligopeptides in solution were heated and filtered through filter paper. The filter cake was autoclaved at 145° C. for 4 hours to separate fats. The filter cake had 25.56 percent dry matter, 0.7 percent ash, and 13.8 to 14 percent cross-linked elastin based upon the weight of the dry matter. Ten pounds of the raw elastin containing material (i.e. the autoclave filter cake) was washed with 300 percent by weight water at 60° C. for 1 hour to remove salt and other soluble impurities. The dispersion of the cross-linked elastin in water was separated by filtration through a stainless steel sieve and washed in accordance with the procedure previously described. Ten liters of 0.5 percent by weight ammonium persulfate and 0.5 percent hydrogen peroxide solution was prepared and the cross-linked elastin containing material combined therewith. The material was then boiled for 3½ hours at 100° C. After boiling the raw elastin containing material in peroxide aqueous media was filtered and mixed with 10 liters of 6 percent hydrochloric acid solution and agitated therewith. The resulting elastin solution was refluxed for 6 hours to partially hydrolyze the elastin. The partially hydrolyzed solubilized elastin was filtered through filter paper and the filtrate dried under vacuum.

The dried material was redissolved in 2.5 kilograms of distilled water and the pH adjusted to 6.4 using a 0.1 percent aqueous sodium hydroxide solution.

Five pounds of the elastin solution was mixed under agitation with 0.05 pounds of activated carbon and boiled for one hour to decolorize the elastin solution. The active carbon was removed by filtration.

The filtered elastin solution was treated with 0.05 percent of hydrogen peroxide based on the weight of the elastin overnight at room temperature to remove haze from the solution and thus impart extreme clarity to the solution. The solution was again filtered and the concentration of the partially hydrolyzed elastin adjusted to 10 to 30 percent.

The final solution was stabilized to impart shelf life thereto at a ratio of 2.5 kilograms of elastin solution to 2.5 grams sorbic acid and 5 grams of phenip.

The elastin solution so produced is useful in pharmaceutical and cosmetic applications.

EXAMPLE II

Example I was repeated except that the dried partially hydrolyzed soluble elastin was dissolved in 70 percent ethanol.

EXAMPLE III

Example I was repeated except that the partially hydrolyzed soluble elastin was dissolved in propylene glycol.

EXAMPLE IV

Example I was repeated except that the partially hydrolyzed soluble elastin which was dried was redissolved in dipropylene glycol.

EXAMPLE V

Thirty-five pounds of washed bovine ligamentum nuchae, 105 pounds of water, 150 grams of ammonium persulfate, and 150 grams of hydrogen peroxide were charged to a rotary drum mixer. The charge was agitated for 3.5 hours at 40° C. After agitation the elastin containing material was separated by filtration and washed with water. The raw elastin containing material was autoclaved at 145° C. for 4 hours. The autoclaved material was washed with water, hydrolyzed and purified in accordance with Example I.

EXAMPLE VI

Example V was repeated except 300 grams of citric acid was added to the elastin containing material prior to autoclavation in order to partially dissolve and extract collagen from the material.

The various solvents for the partially hydrolyzed soluble elastin demonstrate the solubility of the elastin and provide the appropriate media for various cosmetic and pharmaceutical applications.

Although the process in accordance with the invention is specifically set forth in exemplary fashion based upon a starting material of raw hide, untanned tannery wastes, limed splits, trimming scraps, and tendons, other sources of elastin may be used, such as blood vessels, hearts, lungs and the like.

When these other materials are used as starting materials, it is necessary to treat them in the same manner when low in elastin as raw hides, untanned tannery wastes and the like in order to remove collagen, globular proteins, fats and other impurities therefrom in order to have an elastin-rich starting material to produce the partially hydrolyzed soluble elastin in accordance with the invention.

Although the invention has been described with reference to specific materials and specific processes, it is only to be limited so far as is set forth in the accompanying claims.

I claim:

1. A method of preparing soluble partially hydrolyzed elastin comprising:
   treating insoluble elastin with ammonium persulfate;
   partially hydrolyzing the elastin; and
   recovering substantially pure soluble partially hydrolyzed elastin.

2. The method of claim 1 wherein including treating the insoluble elastin with hydrogen peroxide.

3. The method of claim 1 wherein said ammonium persulfate is present at a level of about 0.025 to 0.5 percent by weight based on the weight of insoluble elastin.

4. The method of claim 3 wherein said ammonium persulfate is present at a level of about 0.1 to 0.25 percent by weight based upon the weight of insoluble elastin.

5. The method of claim 1 wherein said insoluble elastin is treated with peroxide in an aqueous solution at reflux and ambient pressure.

6. The method of claim 1 wherein said treated elastin is hydrolyzed by heating in the presence of acid.

7. The method of claim 6 wherein said acid is aqueous acid.

8. The method of claim 7 wherein said acid is HCL.

9. The method of claim 7 wherein said treated elastin is hydrolyzed by heating at reflux and ambient pressure.

10. The method of claim 8 wherein said partially hydrolyzed elastin has a molecular weight of 500 to 1000.

11. The method of claim 1 wherein said partially hydrolyzed elastin contains desmosine and isodesmosine.

12. A method of preparing partially hydrolyzed soluble elastin from fibrous protein containing material comprised of insoluble elastin and collagen comprising:
    treating the fibrous protein containing material with an aqueous solution of a member selected from the group consisting of an alkali earth metal hydroxide and mixtures thereof in the presence of an agent which prevents overswelling of the fibrous protein, said treatment removing substantially all of the hair and fat from the fibrous protein;
    hydrolyzing the polypeptide chains of the collagen to form oligopeptides;
    separating the oligopeptides formed of the collagen from the insoluble elastin;
    treating the insoluble elastin with ammonium persulfate;
    partially hydrolyzing the treated elastin; and
    recovering substantially pure partially hydrolyzed soluble elastin.

* * * * *